Jan. 20, 1931. E. E. WAITE 1,789,918
CLUTCH
Filed Jan. 19, 1928
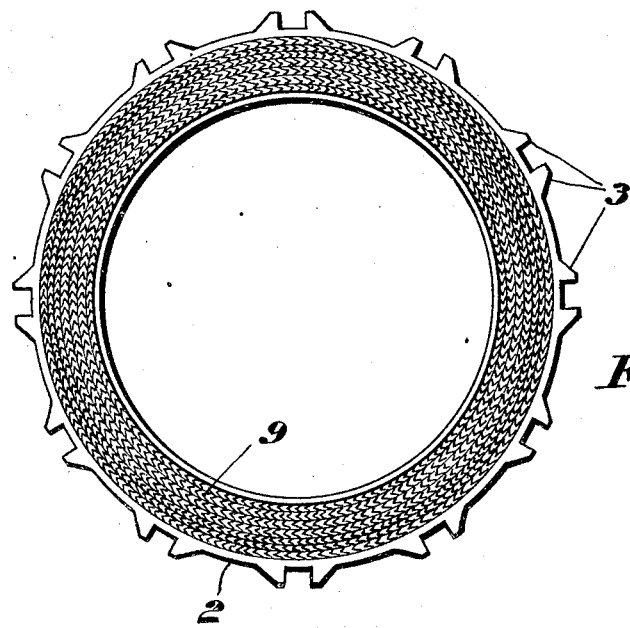
Fig.1
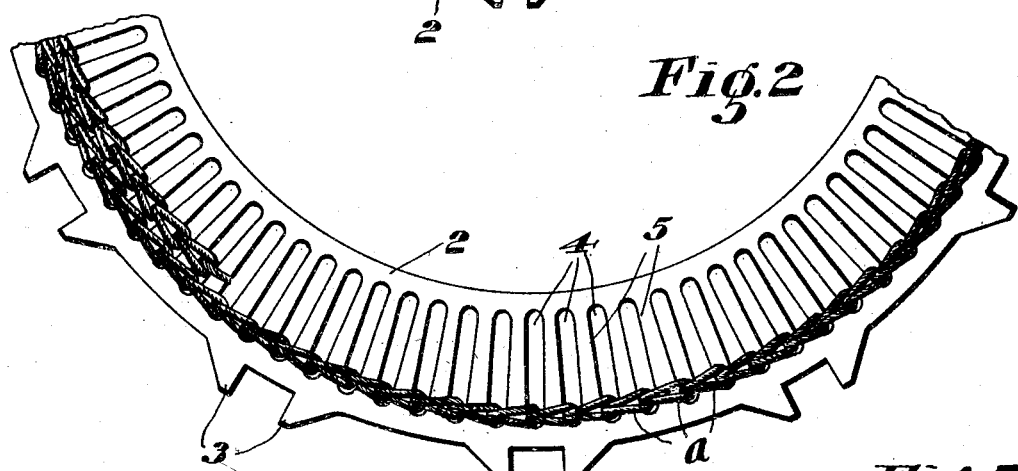
Fig.2
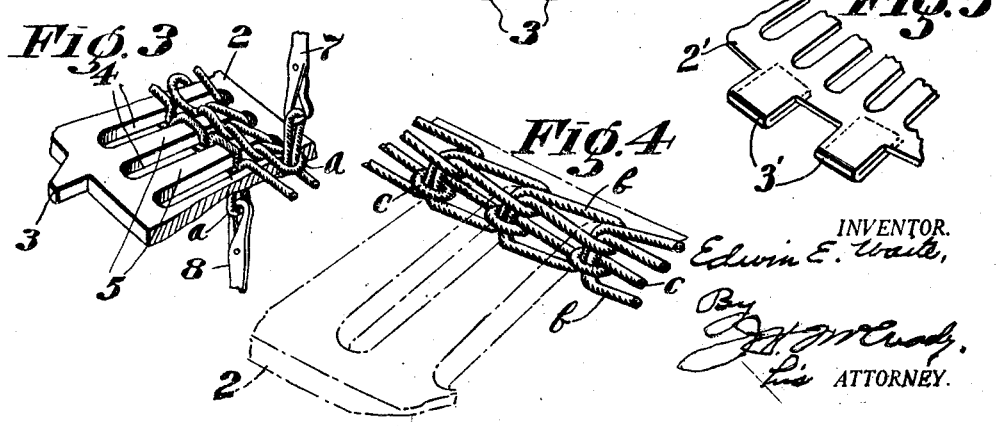
INVENTOR.
Edwin E. Waite,
By
his ATTORNEY.

Patented Jan. 20, 1931

1,789,918

UNITED STATES PATENT OFFICE

EDWIN E. WAITE, OF FRAMINGHAM, MASSACHUSETTS, ASSIGNOR OF ONE-HALF TO MULTIBESTOS COMPANY, OF WALPOLE, MASSACHUSETTS, A CORPORATION OF MASSACHUSETTS

CLUTCH

Application filed January 19, 1928. Serial No. 247,773.

This invention relates to clutches and will be herein disclosed as embodied in a disk clutch. It will be understood, however, that some of the features of the invention are also applicable to other types of clutches and to various types of brakes, all of which will be hereinafter included for convenience in the term "clutches."

As is well understood by those skilled in this art, it is a common practice to interpose a facing or lining of some friction material, such as asbestos, between the driving and driven elements of a clutch. In a disk clutch, for example, each disk of one set usually has an asbestos facing riveted to one or both sides thereof.

The present invention is especially concerned with that type of clutch disk or equivalent element in which the facing is built into the body of the disk or element and is inseparable from it, the facing and the body member to which it is united forming a single article of manufacture. The invention aims to improve the construction of clutch elements of this character and to effect economies in the manufacture of such devices.

The nature of the invention will be readily understood from the following description when read in connection with the accompanying drawings, and the novel features will be particularly pointed out in the appended claims.

In the drawings,

Figure 1 is a plan view of a clutch disk constructed in accordance with this invention;

Fig. 2 is a plan view on a larger scale of a portion of the disk shown in Fig. 1, but showing only a portion of the friction facing of the disk;

Fig. 3 is a perspective view illustrating one method of forming a friction facing on the disk;

Fig. 4 is a similar view showing a slightly different method; and

Fig. 5 shows a modified construction of disk body.

The main body of the disk shown consists of a metal plate 2 having the form of a flat annulus and provided on its outer edge with teeth 3 to cooperate with the ribs, splines, or other driving elements with which a disk clutch commonly is equipped. The disk 2 is provided with a series of narrow slots 4 preferably extending radially thereof and separated from each other by narrow bars 5. As shown, each slot is of uniform width substantially throughout its length, while the bars increase in width very slightly as they extend away from the center of the disk. Preferably, also, these slots are independent of each other and terminate at points in the margins of the disk so that an unbroken rim of metal is provided at both the inner and outer edges of the disk.

The friction facing for this clutch element consists of yarn, or equivalent material, which can be handled in the same manner, preferably made of asbestos fibre and stitched into the slots 4. The stitches may be made either by crocheting, knitting, or sewing. Preferably the yarn is stitched into the slots by a sewing machine which may be either of the chain stitch or lock stitch type.

As shown in Fig. 3, two chain stitch sewing machines are used, one of these machines having a needle 7 extending downwardly, while the other has a needle 8 extending upwardly, and both machines working simultaneously to stitch the filling into the slots. With this arrangement one machine draws stitches toward one face of the disk, while the other draws its stitches toward the opposite face of the disk. In each chain stitch there is a loop a at one side of the work so that in each row or line of chain stitches there are two strands of yarn on one side of the disk and only one strand on the other. Thus by drawing the stitches in alternate lines of stitching toward opposite faces of the disk, the same amount of yarn is disposed on each side of the disk. It is usually more convenient to start the stitching operation at the inner ends of the slots 4, stitching in circumferentially the innermost line or lines of stitching first and then stepping the disk in slightly for the stitching in of the next circumferential line or lines of stitching, these operations being repeated until the slots are substantially filled. Each circumferential line of stitches thus lies outside or farther away from the center of the disk than the preceding line but they all lie side by side and thus form a substantially continuous asbestos facing on each side of the disk. Preferably each stitch is beaten inwardly in a radial direction just after being formed, and the length of the stitches is increased in successive lines of stitching to accommodate the gradual increase in the width of the bars 5.

It will be observed that this method interlocks the facing securely with the bars of the disk, since the bars extend through the loops of the individual stitches. The facing thus is built into the disk and is inseparable from it. Since the interlocking of portions of the yarn at the ends of each stitch occurs at or in the slots, the bunching of the yarn which otherwise would be produced by such interlocking is so located as to leave a smooth surface at each side of the disk. The completed disk is shown in Fig. 1, the facing being indicated at 9.

Fig. 4 shows a novel stitch which I prefer to use instead of the ordinary chain stitch. This is a modified chain stitch made with two threads or yarns $b$ and $c$. The thread $b$ is manipulated to make the usual chain stitch while the thread $c$ is simply given one turn around the thread $b$ at the shank of each loop, the thread $c$ remaining on the opposite side of the disk from the interlocked loops of the chain stitches. Each line of stitching produced in this manner thus has two strands of yarn on each face of the disk. Usually it is preferable to have the needle draw the stitches downwardly instead of upwardly as indicated in Fig. 4, this figure showing the line of stitches upside down. The thread $c$ may be manipulated by a thread finger in such a manner that it will simply give the thread one turn around the shank of the needle as the needle is projected to take the thread for each new stitch.

After the making operations have been completed, the facing may be impregnated with a material which binds the asbestos fibres together and gives the facing approximately the desired co-efficient of friction. For this purpose the binders ordinarily used in impregnating woven clutch facings and brake linings may be employed. A great variety of such binders are used in this art so that no specific composition need be given. Some of these binders are of a rubbery nature while others depend chiefly upon a drying oil or asphaltic substance, or a mixture of the two, to produce the binding action. Usually these binders are dissolved in a solvent in order to promote penetration into the facing. After being impregnated with a suitable binder the entire clutch ring or disk usually is baked to cure the binder, and if desired it may also be pressed to bring the facing down to the desired thickness. Sometimes it is necessary to sand or grind the opposite surfaces slightly for this purpose.

Clutch rings or disks in which the asbestos facing is built into the ring have been made heretofore, and their advantages are well understood by those skilled in this art. In none of these prior constructions, however, so far as I am aware, has the facing been united to the body of the ring or disk by manipulating a yarn so as to form stitches. This method effects substantial economies in the manufacture of a clutch element of this type. It is also unnecessary in making a ring according to this process to leave the ends of the slots open, as has been necessary in the more common, if not all, of the prior constructions. This invention, therefore, produces a disk which, if made of the same weight of metal as prior rings, is very much stronger mechanically. In fact, the metal disk can be made of relatively thin metal and the teeth given the desired thickness by folding the metal. Such a construction is shown in Fig. 5 in which the disk 2' has teeth 3' of double the thickness of the body of the disk.

While I have herein shown and described a preferred embodiment of my invention, it will be understood that the invention may be embodied in other forms and that the process of manufacture may be varied in some respects without departing from the spirit or scope of the invention.

Having thus described my invention, what I desire to claim as new is:

1. A clutch element comprising a slotted metal body with bars separating the slots of said body, and a friction facing of yarn stitched into said slots and interlocked with the bars separating said slots, the interlocking portions of yarn in the stitches being located in said slots.

2. A clutch element of the character described comprising a metal disk having slots therein separated by bars, and a facing of asbestos yarn arranged to form stitches interlocked with said bars, said stitches including interlocked portions of yarn located in said slots.

3. A clutch element of the character described comprising a metal disk having slots therein separated by bars, and a facing of asbestos yarn arranged to form circumferential lines of stitches lying side by side at different distances from the center of the disk, the individual stitches being interlocked with said bars, said stitches including interlocked portions of yarn located in said slots.

4. A clutch element of the character described comprising a metal disk having substantially radial slots therein separated by bars, and a facing of yarn arranged to form circumferential lines of chain stitches lying side by side, said bars extending through the loops of the stitches, and the stitches in adjacent lines being drawn toward opposite faces of the disk.

5. A clutch element of the character described comprising a metal disk having a toothed outer edge and radial slots separated by bars, and a facing consisting of circumferential rows of stitches of asbestos yarn interlocked with said bars, said rows lying side by side, said stitches including interlocked portions of yarn located in said slots.

6. A clutch element of the character described comprising a metal disk having radial slots therein and provided with a substantially continuous outer rim of metal, and a facing of asbestos yarn arranged to form circumferential rows of stitches lying side by side with the bars extending through the loops of individual stitches, the interlocking portions of yarn in the stitches being located in said slots.

7. A clutch element of the character described comprising a metal disk having substantially radial slots therein separated by bars, and a facing of yarn comprising circumferential lines of chain stitches lying side by side, the individual stitches being interlocked with said bars and each line of stitches having the same number of strands of yarn on each side of the disk.

8. A clutch element comprising a metal disc of suitable form having slots therein, adjacent slots being separated by narrow bars, and a facing on said disc formed of circumferential lines of stitches of asbestos yarn, lying side by side, the individual stitches being interlocked with said bars, said stitches including interlocked portions of yarn located in said slots.

9. A clutch element comprising a metal disc of suitable form having slots therein, adjacent slots being separated by narrow bars, and a facing on said disc consisting of chain stitches of yarn filling said slots, said stitches being arranged in a plurality of circumferential lines side by side and enclosing said bars, said stitches being drawn in adjacent lines toward opposite faces of the disc.

10. A clutch disc comprising a metal disk having slots therein spaced from each other by narrow bars and a facing comprising a plurality of circumferential lines of chain stitches of yarn lying side by side, said stitches forming loops in which the bars are located.

EDWIN E. WAITE.